Sept. 3, 1935.  L. M. REYNOLDS  2,013,361

POURING SPOUT

Filed Aug. 4, 1934

Inventor
Lawrence M. Reynolds
By L. B. James
Attorney

Patented Sept. 3, 1935

2,013,361

UNITED STATES PATENT OFFICE 2,013,361

POURING SPOUT

Lawrence M. Reynolds, Pasadena, Calif.

Application August 4, 1934, Serial No. 738,517

1 Claim. (Cl. 221—23)

This invention relates to liquid containers and more particularly to a detachable pouring spout therefor.

The primary object of this invention resides in the provision of a pouring spout adapted to be attached to evaporated milk cans, preferably of the domestic type, to permit the contents thereof to flow in a manner similar to that of a pitcher.

Another object of this invention resides in the provision of a pouring spout adapted to be attached to an evaporated milk can by forcing a certain portion thereof through the top of the can.

A further object of this invention resides in the provision of a pouring spout, for liquid containers of such construction as to become removably secured to the top of a container and form communication with the interior thereof.

A still further object of this invention resides in the provision of a pouring spout, for liquid containers, which, among other salient features, consists of a particularly constructed puncturing element.

Aside from the aforesaid objects of this invention a pouring spout is introduced whereby the inlet port of the liquid passage thereof is disposed in opposed relation to the interior wall of the container so as to cause an up-flow of the contents within the container when tilted to discharge the liquid.

In addition to the objects heretofore set forth, this invention resides in the provision of a pouring spout, for liquid containers, adapted to puncture the top of the container and become removably secured to the top of the container upon establishing communication between the interior of the container and the atmosphere.

Among the several objects of this invention, a pouring spout, for liquid containers, is produced which is provided with a puncturing element adapted to prevent the spout from rotating after seated in operative relation with the container.

With these and other objects in view this invention resides in certain novel features of construction and arrangement of elements to be hereinafter set forth in the specification, illustrated in the accompanying drawing and pointed out in the claim and, while the disclosure depicts my present conception of the invention, the right is reserved to make such changes in construction as come within the scope of the claim.

In the accompanying drawing forming a part of this application:

Figure 1:
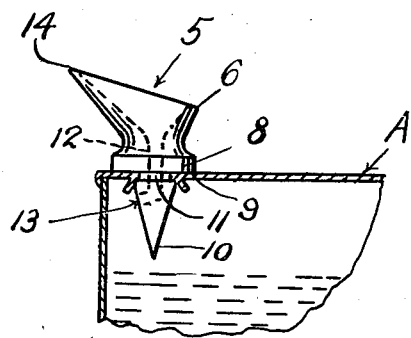
Fig. 1 is a vertical sectional view through the top portion of a liquid container showing this invention in operative relation therewith.
Figure 2:
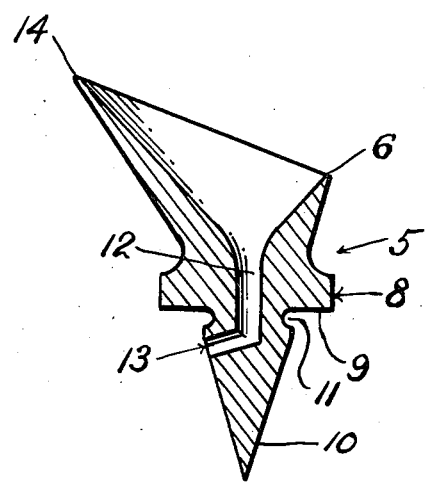
Fig. 2 is an enlarged vertical sectional view through the pouring spout per se.
Figure 3:
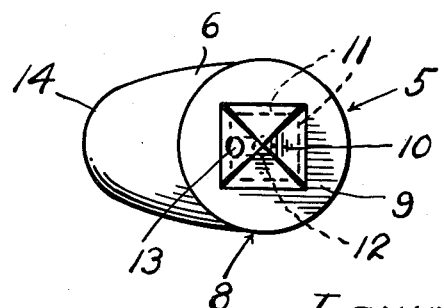
Fig. 3 is a bottom view of the pouring spout.

In the present embodiment of this invention the numeral 5 designates, in general, a pouring spout constructed in accordance with this invention, the same being shown by Fig. 1 in operative relation with a liquid container A, preferably of that type utilized in shipping evaporated milk to the consumer.

The aforesaid pouring spout 5, forming the subject matter of this application is preferably formed of suitable material having a flared mouth 6 merging from the upper surface of an annular shoulder 8 while protruding from the lower surface 9 of said shoulder is a sharp prong 10 preferably rectangular in cross section.

Formed in the prong 10 in close proximity to the lower surface 9 of the shoulder is a continuous groove 11 which is provided for the reception of that portion of the container top distorted during the puncturing of the same as the prong is forced into the container and finally seated in operative relation thereto.

Extending through the pouring spout is a liquid passage 12 having an inlet port 13 disposed below the aforesaid groove 11 and on that side of the prong adapted to lie closest to the interior side of the container. Through this arrangement of the inlet port 13 of the passage 12 relative to a flared lip 14 on the mouth 6, liquid within the container will flow in a general upward direction upon tilting the container, thus permitting sediment in the liquid to gravitate and buoyant substances to rise in a direction opposite the flow of the liquid while being discharged from the container. Further such co-relation of elements subjects the liquid to a slight degree of pressure as it enters the port 13 remote from its surface when the container is tilted for discharging its contents.

With a pouring spout constructed as aforesaid, it is apparent that a cheap article of manufacture is produced and, through the instrumentality of the co-related elements, evaporation of the contents of a container and clogging of the spout is reduced to the minimum.

Having thus fully described my invention what I claim and desire to protect by Letters Patent is:

A pouring spout for liquid containers comprising a body portion having an enlarged intermediate part, the lower face of which forms a shoulder, a prong depending from the enlarged part and of substantially rectangular shape in cross section, the upper end of the prong being of considerably less area than the larger part and connected to the central part thereof, said upper end of the prong having a groove therein extending around the four sides thereof with the upper wall of the groove forming an inner extension of the shoulder, a spout part extending upwardly from the enlarged part and having a side portion flaring outwardly and upwardly, said spout part having a recess therein which extends from the top face thereof to a point adjacent the juncture of the spout part with the enlarged part, said recess flaring upwardly from said point with that wall of the recess in the flared side portion flaring more than the remaining wall, said body portion having a passage therein provided with a substantially vertical part extending from the bottom of the recess through the enlarged part into the upper end of the prong, and a downwardly and outwardly sloping part extending from the lower end of the vertical part through that wall of the prong which is directly below the flaring side portion of the spout part.

LAWRENCE M. REYNOLDS